(No Model.)
O. P. JACKSON.
CHURN.
No. 418,185. Patented Dec. 31, 1889.
Fig. 2. Fig. 1.
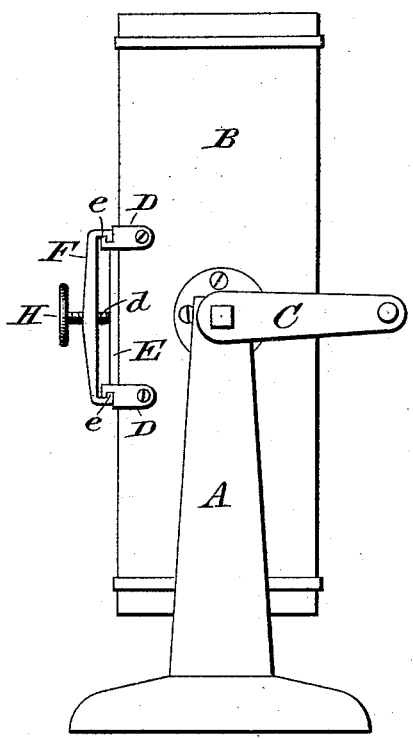 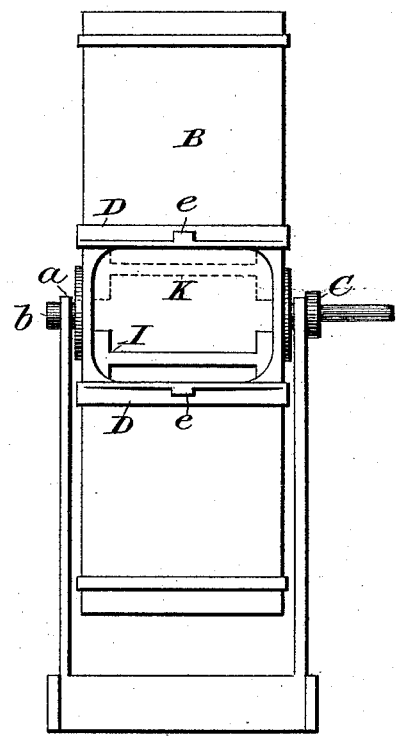
Fig. 4. Fig. 5. Fig. 3.
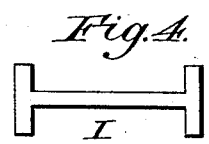 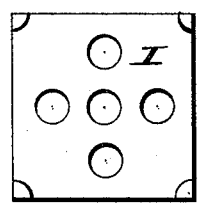
Witnesses:
Frank Stinger
Joseph McGregor
Inventor:
Oliver P. Jackson
N. PETERS, Photo-Lithographer, Washington, D. C.

UNITED STATES PATENT OFFICE.

OLIVER P. JACKSON, OF VICTOR, ASSIGNOR, BY DIRECT AND MESNE ASSIGNMENTS, TO HUGH CAMPBELL AND WILLIAM H. H. DICKINSON, BOTH OF MISSOULA, MONTANA.

CHURN.

SPECIFICATION forming part of Letters Patent No. 418,185, dated December 31, 1889.

Application filed May 20, 1889. Serial No. 311,491. (No model.)

*To all whom it may concern:*

Be it known that I, OLIVER P. JACKSON, a citizen of the United States, residing at Victor, in the county of Missoula and Territory of Montana, have invented a new and useful Churn, of which the following is a specification.

My invention relates to improvements in churns in which the churn is rotated and the churning done by gravitation; and the object of my improvement is to provide a churn which will gather and work the milk out of the butter, thus effecting a saving of time and labor and also improving the quality of the butter by working it more thoroughly than can be done by hand. I attain these objects by the mechanism illustrated in the accompanying drawings, in which—

Figure 1 is a front view of the churn with the lid removed to show the position occupied by the dasher. Fig. 2 is a side view; Fig. 3, a top view of the churn. Figs. 4 and 5 are detailed views of the dasher.

Similar letters refer to similar parts throughout the several views.

The stand A is provided with the bearings $a\ a$, in which rest the trunnions $b\ b$, which are secured to the churn B at the center of the sides and to one of which the crank C is attached. The cast-iron braces D D are provided with the projections or lugs $e\ e$, which engage with the ends of the arch F, which serves to tightly close the lid or cover E by means of the screw $d$, which is provided with the hand-wheel H and which passes through the center of said arch.

As the churn is rotated the dasher I changes alternately from the position shown in the drawing, (see Fig. 1) to that shown by the dotted lines K, when its movement is checked instantly by means of any suitable stop placed inside the churn, and the cream is forced through the holes in the dasher by its own weight, assisted by the momentum it acquires in falling with the dasher. The dasher I is provided at the corners with the slides $g\ g$, which prevent it from tilting. When the churn has been operated sufficiently to break the cream, the granules of butter pass freely through the holes in the dasher until enough of them combine together in one compartment of the churn to form a mass of butter larger than the holes in the dasher, when the roll of butter so formed collects all the balance of the particles, and by beating against the walls of the compartment which contains it the milk is all worked out and the butter when taken from the churn is in a marketable condition.

As the butter is liable to gather in either end of the churn, I prefer having the opening in the middle of the churn, as then the butter can readily be removed from either compartment.

What I claim as my invention, and desire to secure by Letters Patent, is—

The rotating churn having at its central internal parts a loose perforated dasher I, provided with slides $g$ at its corners, whereby it is prevented from tilting, but adapted to slide back and forth in the churn as it rotates, as set forth.

OLIVER P. JACKSON.

Witnesses:
 FRANK STINGER,
 J. W. McGREGOR.